(12) United States Patent
Karatzis

(10) Patent No.: US 10,604,874 B2
(45) Date of Patent: Mar. 31, 2020

(54) PLASTIC MESH HAVING DOUBLE CHAINS, AND DEVICE FOR PRODUCING A PLASTIC MESH

(71) Applicant: Karatzis S.A. Industrial & Hotelier Enterprises, Heraklion (GR)

(72) Inventor: Antonios Karatzis, Heraclion (GR)

(73) Assignee: Karatzis S.A. Industrial & Hotelier Enterprises, Heraklion (GR)

( * ) Notice: Subject to any disclaimer, the term of this patent is extended or adjusted under 35 U.S.C. 154(b) by 0 days.

(21) Appl. No.: 16/098,737

(22) PCT Filed: Oct. 24, 2016

(86) PCT No.: PCT/EP2016/075567
§ 371 (c)(1),
(2) Date: Nov. 2, 2018

(87) PCT Pub. No.: WO2017/190812
PCT Pub. Date: Nov. 9, 2017

(65) Prior Publication Data
US 2019/0145030 A1    May 16, 2019

(30) Foreign Application Priority Data
May 4, 2016    (DE) .................. 10 2016 108 342

(51) Int. Cl.
*D04B 21/12*    (2006.01)
*D04B 23/22*    (2006.01)

(52) U.S. Cl.
CPC ............ *D04B 21/12* (2013.01); *D04B 23/22* (2013.01); *D10B 2505/10* (2013.01); *D10B 2507/02* (2013.01)

(58) Field of Classification Search
CPC ........ D04B 21/12; D04B 21/10; D04B 23/22; D04B 27/24
(Continued)

(56) References Cited

U.S. PATENT DOCUMENTS 1,475,333 A * 11/1923 Ward .................. D04B 21/18
66/195
3,254,510 A * 6/1966 Lesley .................. D04B 21/04
28/159
(Continued)

FOREIGN PATENT DOCUMENTS

DE    4008477 A1    9/1991
DE    9116083 U1    2/1992
(Continued)

OTHER PUBLICATIONS

JP Office Action dated Jan. 7, 2020.
English Translation of JP Office Action dated Jan. 7, 2020.

*Primary Examiner* — Danny Worrell
(74) *Attorney, Agent, or Firm* — Murphy, Bilak & Homiller, PLLC

(57) ABSTRACT

The invention relates to a plastic mesh having a plurality of chains extending parallel to one another in a longitudinal direction, which plastic mesh has a plurality of groups of chains (2) adjacent to one another, which are in each case formed of at least two chains (2a, 2b). The groups of chains (2) have a greater spacing relative to one another or also relative to a further individual chain (1) than the chains (2a, 2b) within a group of chains (2). A thread (3) runs in a zigzag between two adjacent groups of chains (2) or also between one group of chains (2) and an individual chain (1) and connects the chains (1) or groups of chains (2).

8 Claims, 4 Drawing Sheets

(58) Field of Classification Search
USPC .......................................... 66/195, 193, 192
See application file for complete search history.

(56) References Cited

U.S. PATENT DOCUMENTS

| | | | | |
|---|---|---|---|---|
| 3,992,904 | A * | 11/1976 | Webb | D04H 1/4258 66/190 |
| 4,074,543 | A * | 2/1978 | Schmidt | D04B 21/12 66/193 |
| 4,306,429 | A * | 12/1981 | Warsop | D04B 21/165 66/190 |
| 4,838,016 | A | 6/1989 | Frogbrook et al. | |
| 4,918,793 | A * | 4/1990 | Spindler | A44B 19/406 24/392 |
| 5,619,869 | A * | 4/1997 | Tacy | D04B 21/06 66/195 |
| 6,082,148 | A * | 7/2000 | Wakai | A44B 19/343 66/192 |
| 6,141,993 | A * | 11/2000 | Whitbeck | D04B 21/10 66/195 |
| 6,250,117 | B1 * | 6/2001 | Wunner | D04B 21/10 442/312 |
| 6,314,768 | B2 * | 11/2001 | Motoya | D04B 21/10 66/195 |
| 6,630,414 | B1 * | 10/2003 | Matsumoto | A47C 31/006 442/1 |
| 6,706,376 | B1 * | 3/2004 | Von Fransecky | D04B 21/10 428/212 |
| 9,574,289 | B2 * | 2/2017 | Lieber | D04B 21/12 |
| 10,208,409 | B2 * | 2/2019 | Lieber | D04B 21/12 |
| 2002/0157429 | A1 * | 10/2002 | Matsumoto | D04B 21/10 66/195 |
| 2003/0106346 | A1 * | 6/2003 | Matsumoto | D04B 21/10 66/195 |
| 2010/0031705 | A1 * | 2/2010 | Higgins | D04B 21/20 66/170 |
| 2016/0101333 | A1 * | 4/2016 | McCampbell | A63B 59/20 473/513 |

FOREIGN PATENT DOCUMENTS

| | | |
|---|---|---|
| DE | 19638392 A1 | 4/1997 |
| DE | 69519242 T2 | 3/2001 |
| EP | 1851385 B1 | 11/2015 |
| GB | 2124975 A | 2/1984 |
| JP | H1175580 A | 3/1999 |
| JP | 2006070398 A | 3/2006 |
| JP | 2006118082 A | 5/2006 |
| JP | 3131599 U | 5/2007 |
| JP | 2014511442 A | 5/2014 |
| KR | 200386211 Y1 | 6/2005 |
| RU | 1837742 C | 8/1993 |
| WO | 2012160403 A1 | 11/2012 |

* cited by examiner

Fig. 2
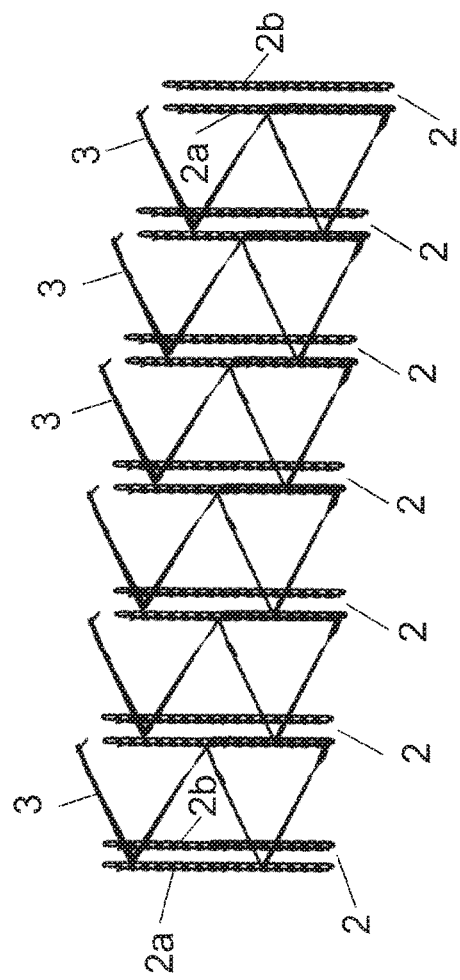
Fig. 2A
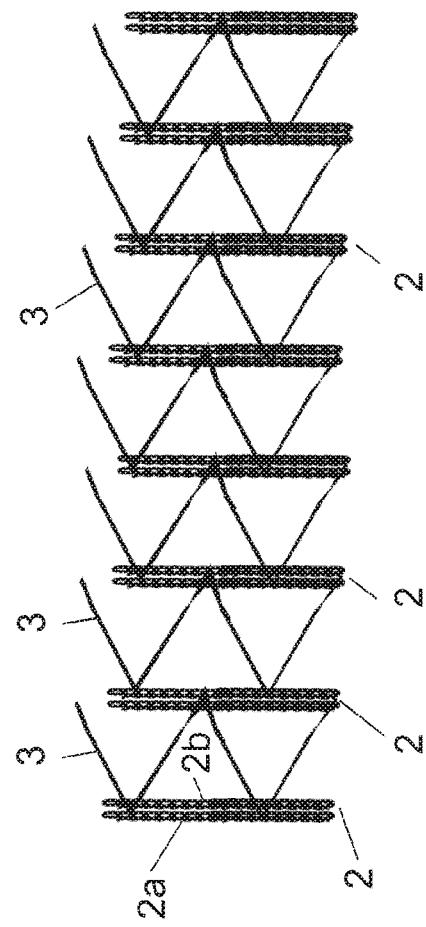
Fig. 2B

PLASTIC MESH HAVING DOUBLE CHAINS, AND DEVICE FOR PRODUCING A PLASTIC MESH

The present invention pertains to a plastic mesh, in particular, a so-called Raschel mesh.

Such plastic meshes or Raschel meshes are well-known. Raschel meshes serve a wide variety of intended uses and are warp knit from a plastic thread with the aid of suitable devices (Raschel machines) by entwining respective plastic threads into threads with the aid of specific needles across the entire machine width.

An example of such a Raschel mesh is known from EP 1 851 385 A1, which shows the use of a Raschel mesh for a construction site fence by way of example. Depending on the strength of the threads used, different applications are possible. For example, very light meshes can be made, which serve for wrapping hay bales, for example.

For the production of such light meshes, it is, on one hand, essential that the meshes have a weight as low as possible, which goes hand in hand with a correspondingly low material expenditure and thus lower material costs. On the other hand, the meshes must also achieve sufficient strength to be capable of fulfilling their function. Hence, it is generally not possible to save material by using thinner plastic threads or plastic threads with a smaller cross-section since the thin threads will then no longer have sufficient strength.

The object of the present invention is to provide a plastic mesh by which it is possible to reduce the use of material and thus the weight, without suffering losses of strength.

The object is solved, in accordance with the invention, by a plastic mesh having the features of claim 1. Advantageous embodiments can be taken from the dependent claims.

A plastic mesh comprises a plurality of chains extending parallel to one another in longitudinal direction, wherein at least two chains extend at a short distance to one another and form a group of chains. At least one additional chain is adjacent to the group of chains, wherein the distance between this chain and the group of chains is greater than the short distance between the chains within the group of chains. A thread runs back and forth between the additional chain and the group of chains and connects the additional chain and the group of chains.

The plastic mesh can, in particular, be a so-called Raschel mesh which comprises chains warp knit from threads. In this process, every individual chain is produced by entwining one or more threads. A plurality of chains can be warp knit parallel at the same time on suitable machines, in particular, on Raschel machines.

The various chains or groups of chains are—as will be explained later—each transversely connected by additional threads running back and forth, whereby the entire plastic mesh is formed.

In this process, at least one group of chains, however, preferably a plurality of groups of chains, in which at least two individual chains each run relatively close, i.e. at a short distance, to one another is formed by the Raschel machine and the needles existent in the Raschel machine.

While in the prior art only one chain runs at a time which is transversely connected with adjacent additional chains on the left and right-hand sides, at least one group of chains or a plurality of groups of chains exists according to the invention, which are then jointly connected to an additional chain (or a group of chains) via threads running back and forth on the left and right-hand sides.

Thus, the plastic mesh can be formed of individual chains of threads (only one chain warp knit from one or more threads) and of double chains of threads (a group of chains comprising two chains each, warp knit from one or more threads). However, a group of chains can also comprise more than two chains.

The arrangement of individual chains and groups of chains can be chosen depending on the intended use. For example, it is possible to provide a plurality of groups of chains at the edge of the plastic mesh, which—as provided with double chains in each case—have a greater strength than individual chains. A plurality of individual chains may then run in the central zone of the plastic mesh when viewed across the width, so that the mesh has less strength there. Similarly, it is also reversely possible to provide the peripheral zones with individual chains and fit the central zone with a plurality of groups of chains if greater strength is required there.

In one variant, single chains and groups of chains can be provided alternatingly which are each connected by threads running back and forth.

Naturally, the plastic mesh can also be completely formed by groups of chains, i.e. with at least double chains in each case, which then, in turn, are connected to threads running back and forth.

The threads running back and forth connect the spaces existing between chains adjacent at a greater distance.

Due to the fact that at least a portion of the chains is grouped into groups of chains, a particularly high strength of the plastic mesh can be achieved. In return, the chains can be made of a plastic thread material that has a smaller thickness than previous threads. Thus, a weight reduction can be achieved while the strength of the mesh stays the same. Similarly, however, it is also possible to produce a mesh where the weight per unit of quantity in proportion to known meshes is unchanged, but a greater strength is achieved.

In addition, a better area coverage can be achieved with the aid of the double chains when packing objects by wrapping them with the mesh. Also, the optical impression can be improved by the double chains.

Viewed across the width of the mesh, the number of chains per width is increased by providing groups of chains, whereby the strength can be increased even if the individual chains are made of a thinner plastic material.

The additional chain can, in turn, be part of an additional group of chains which is formed by the additional chain and at least one more chain, with the thread running back and forth between the group of chains and the additional group of chains.

A plurality of individually running chains can be provided, which have a greater distance to adjacent chains and thus are not part of a group of chains, wherein, in addition, a plurality of groups of chains is provided. It is therefore possible—as has already been explained above—to arrange individual and double chains of threads in an arbitrary manner or, where required, provide double chains of threads (groups of chains) at selected sites only. To achieve this, corresponding needles (double needles) must be provided on the Raschel machine, as will be explained later.

A plurality of groups of chains adjacent to one another can be provided, which are each formed of at least two chains (double chains), wherein the groups of chains have a greater distance between one another than the chains within a group of chains, and wherein a thread runs back and forth between two adjacent groups of chains in each case and connects the groups of chains. To this end, the thread is sewn in with the two groups of chains concerned.

The distance between two directly adjacent chains within a group of chains can be in a range between 2 millimeters and 10 millimeters, in particular, in a range between 2 millimeters and 5 millimeters. Thus, the distance between the virtual centerlines (longitudinal lines) of the chains is understood to be the distance. Since the chains have a specific width, a distance in the lower range, i.e. a distance of 2 millimeters, for example, means that the chains within this group of chains make contact. The distance values given correspond to the so-called "short distance".

Thus, the specification "short distance" means that the chains need not have a distance between one another virtually at all and thus can make contact. Thus, they should extend closely to one another.

The distance between the respective group of chains and the additional chain or an adjacent group of chains can be in a range between 20 millimeters and 80 millimeters, in particular, between 25.4 mm (1 inch) and 76.2 mm (3 inches), in particular, between 25.4 mm (1 inch) and 50.8 mm (2 inches).

Here, too, the distance is regarded as the distance between the virtual (imagined) centerlines from respective adjacent chains.

The total width of the plastic mesh can be in a range between 30 and 200 centimeters, in particular, between 50 and 170 centimeters, with even broader meshes being easily possible.

At least one of the chains can be made of a plastic film thread. In this process, such a thread is cut or extruded from a plastic film and then processed with the aid of the Raschel machine. Due to corresponding entwining, a chain is warp knit or knit from a thread. In this process, it is also possible to knit an individual chain not only from one, but from two or more threads.

The plastic film of a plastic film thread can have a thickness of 100 micrometers or less, in particular, of 80 micrometers or less, in particular, of 60 micrometers or less, in particular, of 40 micrometers or less. Naturally, corresponding intermediate areas are also possible. Up to now, plastic film threads with a thickness of 80 micrometers, for example, have been processed in the prior art. As a result of the increased strength due to the groups of chains having double chains, it can be sufficient to process threads with a thickness of only 60 micrometers, for example, to make the chains therefrom.

In total, a plastic mesh produced in such a manner can, for example, achieve a weight of merely 10 to 12 grams per linear meter.

At least a portion of the groups of chains can comprise three or more chains. It is thus possible to form individual or even all groups of chains particularly strong and fit them with more than two chains.

The thread running back and forth between two adjacent chains or groups of chains can, for example, run zigzag. It is sewn in with the chains or groups of chains concerned and fills the broad spaces between these chains or groups of chains.

The thread running back and forth can be a single thread. In a special embodiment, it can consist of at least two thread elements running together with one another and thus be a double thread. The strength can also be increased in this way.

A device for producing such a plastic mesh can, in particular, be a Raschel machine, wherein at least two guide needles are each provided on the Raschel machine to each guide a plastic film thread, from which each chain is knit. The two guide needles can each be carried by a common guide needle carrier. Two needles can be assigned to the two guide needles and carried by a common needle carrier.

The distance between two adjacent guide needles and/or between two directly adjacent needles can be in a range between 2 and 10 millimeters, in particular, between 2 and 5 millimeters. Thus, the groups of chains or, in this case, the double chains can be produced very easily during the normal operation of the Raschel machine.

These and additional features and advantages of the invention will be explained in the following text based on examples with the aid of the accompanying figures, in which:

FIG. 2 shows another embodiment of a plastic mesh in different situations of use;

Figure 1:
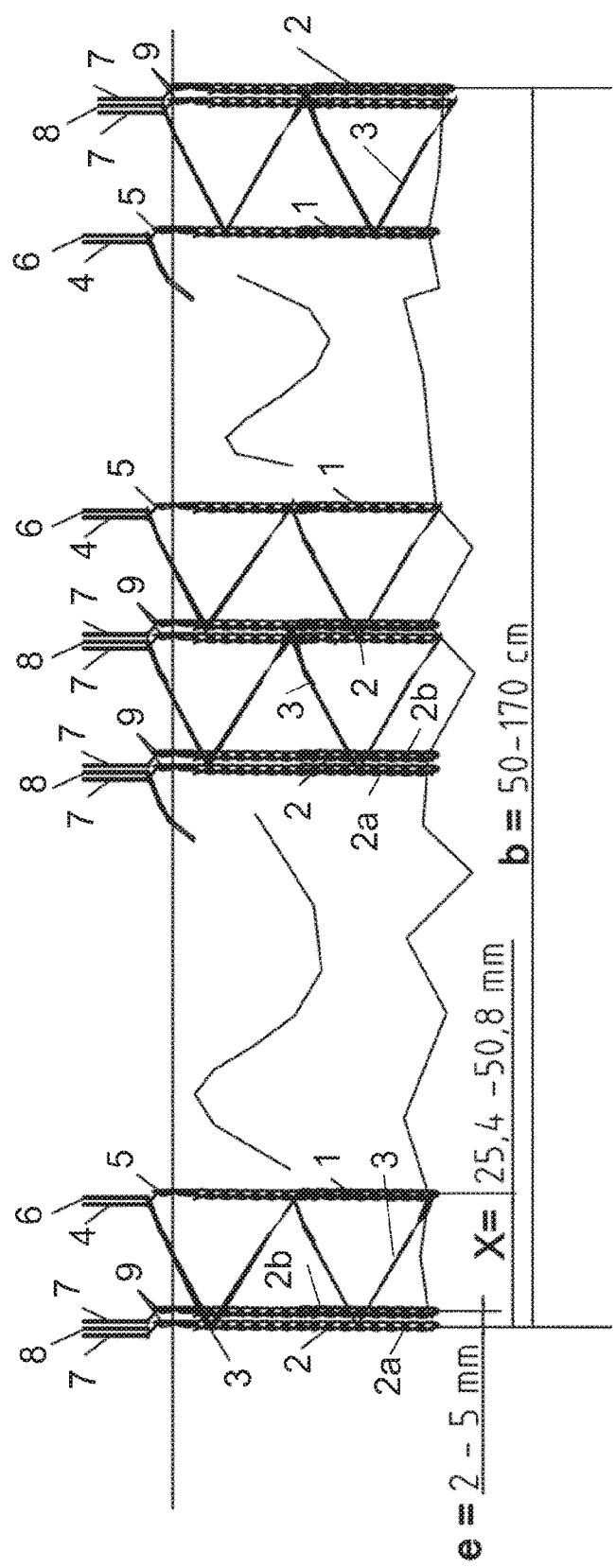
FIG. 1 shows a section from a plastic mesh according to the invention.

In the plastic mesh, several or a plurality of chains extend parallel to one another, of which only some are partially shown in FIG. 1. Every single chain is knitted or woven from one or more plastic threads, wherein the production processes of the plastic threads or chains run parallel so that the plastic mesh can be warp knitted as a unit.

A portion of the chains runs as a single chain 1. Other chains are paired to one another and form a double chain 2 each. The arrangement of two chains 2a, 2b of a double chain 2 paired to one another, i.e. running toward one another at only a very short distance, is also designated as a group of chains.

As can be seen from FIG. 1, the individual chains 2a, 2b of a double chain 2 extend at a short distance e of, for example, 2 to 5 millimeters only. In this process, the distance e is so small that the chains 2a, 2b will make contact at least partially in practice.

Compared therewith, the single chains 1 run at a greater distance x of, for example, 1 inch (25.4 millimeters) up to 2 inches (50.8 millimeters), depending on the setup of the Raschel machine. The values given are approximate figures and can easily deviate in practice. In this process, it is solely decisive that the distance between the chains within a group of chains or double chain 2 is significantly smaller than the distance x to a distantly adjacent chain.

The total width of the mesh can, depending on the type of application, also be varied and, for example, be in a range of 50 to 170 centimeters.

A thread 3, which is also made of a plastic film material and covers the broad distance, runs zigzag between the distantly adjacent chains in each case. The thread 3 is sewn in with the respective chains (single chains 1, double chains 2).

FIG. 1 only shows a section from the entire mesh. Naturally, also the zones in between are fitted with corresponding single chains 1 or double chains 2. In total, at least 50 chains or more can extend parallel across the width of the mesh.

For the production of a single chain 1, a single guide needle 4 is provided, which works together with a single needle 5. Thus, by corresponding guidance of the plastic thread, the single chain 1 can be knitted. In addition, a guide needle plate 6 is provided.

A double chain 2 consisting of two single chains 2a, 2b is produced with the aid of two guide needles 7, which are held by a guide needle carrier 8 and each work together with a needle 9.

FIG. 2 shows a variant of the mesh where no single chains, but only double chains 2 are provided, which are each connected to one another by threads 3.

FIG. 2A shows the starting situation where the respective single chains 2a, 2b of a double chain 2 still have a specific distance between one another.

After having wrapped the mesh around a hay bale, for example, the chains 2a, 2b tighten and thus contract closer, as shown in FIG. 2B.

The distance between the single chains 2a, 2b is reduced in such a manner that the single chains 2a, 2b make contact. Thus, the chains 2a, 2b mutually reinforce one another so that a high strength can be achieved.

When wrapping a hay bale on a wrapping machine, the mesh is wrapped around the hay bale with high tension so that it is pressed tight. Thus, the chains 2a, 2b are tightened and move closer to one another, whereby a tighter effect on one hand and a better optical result of the bale on the other hand is achieved.

Figure 3:
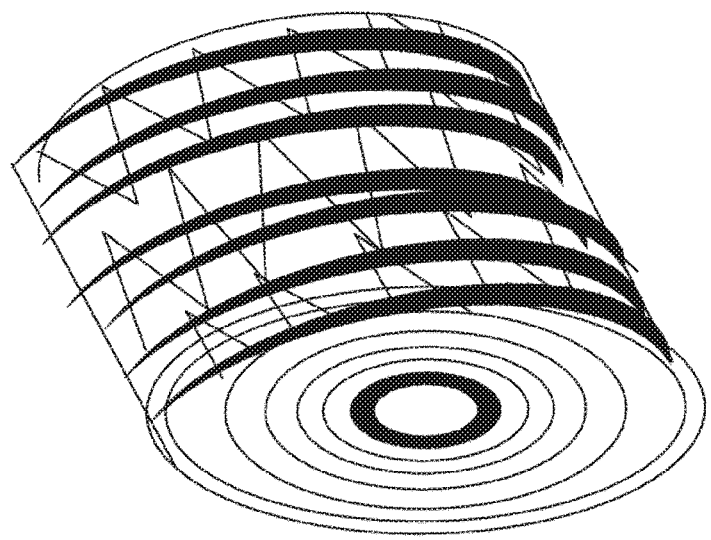
FIG. 3 shows a hay bale wrapped into the plastic mesh.

FIG. 3 shows schematically how a hay bale can be held together by the plastic mesh according to the invention.

The improved optical overall impression can be attributed to the provision of double chains 2.

Figure 4:
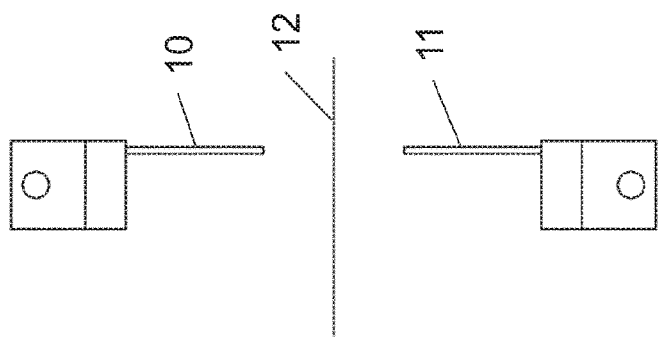
FIG. 4 shows a schematic setup of a Raschel machine in its previous design.

In FIG. 4, a section from a schematic setup of a well-known Raschel machine is shown, comprising a guide needle 10 and a plurality of needles 11 (of which only one is shown in FIG. 4) arranged around a machine level 12. The machine level 12 characterizes the area, in which the needles 10, 11 work together to warp knit a respective chain from a plastic film thread.

Figure 5:
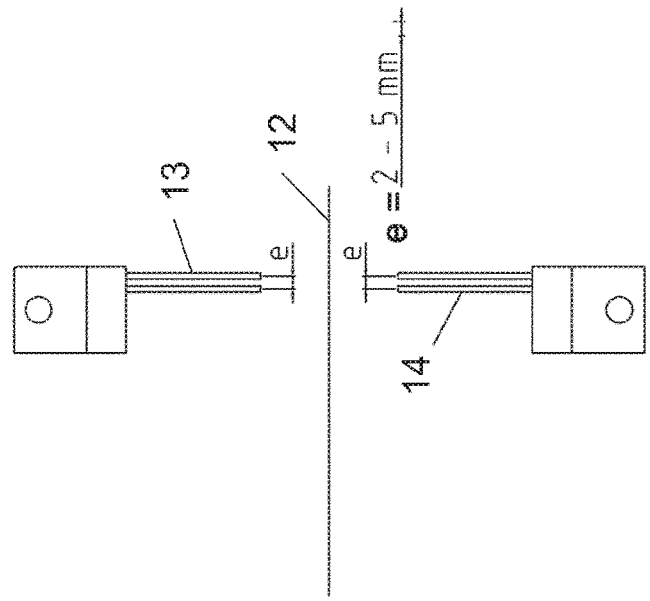
FIG. 5 shows a detail from a Raschel machine according to the invention.

In contrast, FIG. 5 shows a novel Raschel machine, comprising a double guide needle 13 opposite to which corresponding double needles 14 are arranged. The distance between the guide needles of the double guide needle 13 is e=2-5 mm in the example shown and is adjustable. For the adjustment of the distances between the needles or guide needles, the Raschel machine can be modified accordingly.

The arrangement shown in FIG. 5 is capable of producing a double chain 2. Accordingly, for the production of an entire mesh, many double guide needles 13 and double needles 14 must be provided which must be arranged side by side in the area of the machine level 12, as shown in FIG. 1.

The invention claimed is:

1. A plastic mesh, comprising a plurality of chains extending parallel to one another in a longitudinal direction, wherein:
   a plurality of groups of chains is adjacent to one another and each group of chains is formed of at least two chains;
   the at least two chains forming a group of chains extend at a short distance to one another;
   adjacent ones of the groups of chains have a greater distance between one another than between the at least two chains forming each group of chains;
   a thread runs back and forth between each of two adjacent ones of the groups of chains in each case and connects the each of the two adjacent ones of the groups of chains;
   the plurality of chains of the plastic mesh is completely grouped as the groups of chains.

2. The plastic mesh of claim 1, wherein the distance between two directly adjacent chains within a group of chains is in a range between 2 and 10 mm.

3. The plastic mesh of claim 1, wherein the distance between a group of chains and the at least one additional chain is in a range between 20 millimeters and 80 millimeters.

4. The plastic mesh of claim 1, wherein at least one of the chains is made of a plastic film thread.

5. The plastic mesh of claim 4, wherein a plastic film of the plastic film thread has a thickness of 100 μm or less.

6. The plastic mesh of claim 1, wherein at least a portion of the additional groups of chains has three or more chains.

7. The plastic mesh of claim 1, wherein the thread running back and forth between the additional chain and the group of chains runs zigzag.

8. The plastic mesh of claim 1, wherein the thread running back and forth between the additional chain and the group of chains comprises at least two thread elements running together with one another.

* * * * *